(12) United States Patent
Wieser

(10) Patent No.: US 6,450,745 B2
(45) Date of Patent: Sep. 17, 2002

(54) DOWEL WITH A WEAKENED SECTION ADJOINING THE LEADING THREADED END THEREOF

(75) Inventor: Jürgen Wieser, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/808,254

(22) Filed: Mar. 14, 2001

(30) Foreign Application Priority Data

Mar. 15, 2001 (DE) .......................................... 100 12 644

(51) Int. Cl.$^7$ .......................... F16B 13/12; F16B 37/04
(52) U.S. Cl. ........................ 411/58; 411/60.1; 411/181; 411/437
(58) Field of Search .................... 411/58, 60.1, 60.3, 411/57.1, 63, 44, 180–183, 433, 437

(56) References Cited

U.S. PATENT DOCUMENTS

| | | | | |
|---|---|---|---|---|
| 1,025,275 A | * | 5/1912 | Kennedy | |
| 2,707,897 A | | 5/1955 | Beeson | |
| 4,259,890 A | * | 4/1981 | Walsh | |
| 4,408,938 A | * | 10/1983 | Maquire | |
| 4,968,200 A | * | 11/1990 | Mark | |
| 5,664,901 A | * | 9/1997 | Mayr | |
| 5,906,464 A | * | 5/1999 | Wedening | |

FOREIGN PATENT DOCUMENTS

| | | |
|---|---|---|
| EP | 0008085 | 2/1980 |
| EP | 0388694 | 9/1990 |
| EP | 0736695 | 10/1996 |

\* cited by examiner

Primary Examiner—Flemming Saether
(74) Attorney, Agent, or Firm—Sidley Austin Brown & Wood, LLP

(57) ABSTRACT

An expansion dowel has an expansion sleeve (7) insertable into an axially extending dowel body (1) which has a central through opening (2) and a collar (6). The leading end region (3) of the dowel body (1) in the setting direction (S) has an internal thread (8) acting as a load application means, and the oppositely located, trailing end region (4) has at least one axially extending slit (5), and serves to receive the expansion sleeve (7). Due to the fact that there is at least one joint arranged in the leading end region (3) of the dowel body (1) adjoining the internal thread (8), a threaded rod (10) can be inserted up to the desired position in the through opening (2) by a slight axial pressure in the setting direction (S).

9 Claims, 1 Drawing Sheet

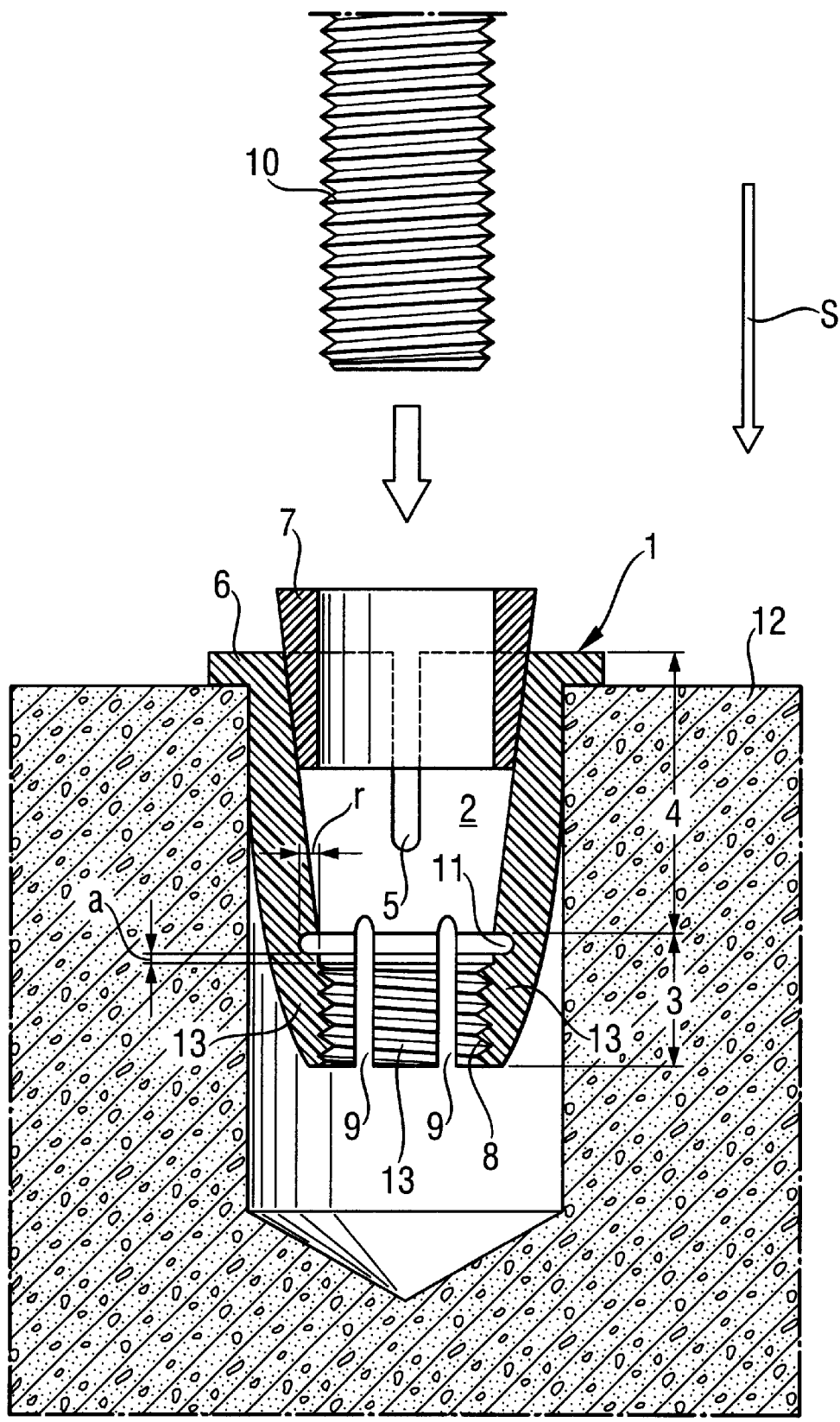

DOWEL WITH A WEAKENED SECTION ADJOINING THE LEADING THREADED END THEREOF

BACKGROUND OF THE INVENTION

The invention is directed to an expansion dowel formed of an axially extending dowel body and an expansion sleeve. The dowel body has a central through opening with an inner diameter decreasing, at least partly, in the setting direction and with an internal thread as load application means in the region of the through opening at the leading end in the setting direction. Further, the trailing end of the dowel body has a collar extending radially outwardly and the expansion sleeve has a cylindrical inside surface and outside and an outside surface which narrows in diameter at least partly in the setting direction.

Expansion dowels of the type mentioned above are used particularly for hanging intermediate or drop ceilings, paneling, frames, pipes, lines and the like. Since these expansion dowels are set in great numbers, it is particularly required that they can be produced economically and can be placed very quickly and without special effort regarding tools. The expansion dowels are constructed so that one part is formed as a dowel body which serves to absorb or receive the load. By hammering an expansion element into the dowel body, the latter expands in a prepared receiving borehole in rock, concrete, masonry and similar receiving materials. However, they are also used in less hard receiving materials, such as wood.

An expansion dowel of the type mentioned above is known, for example, from DE 195 12 415 A1 and comprises a cylindrical dowel body with a collar and an expansion sleeve. The dowel body has a through opening. The known expansion dowel is expanded by means of the expansion sleeve which is driven into the through opening opposite to the setting direction. In the leading region of the dowel body, the inner diameter surface of the through opening has an internal thread and serves as load application means. To fasten loads, a suitable threaded rod can be inserted into the through opening and screwed into the internal thread. To ensure that the threaded rod is received, the expansion sleeve has an inner diameter that is greater than or equal to the inner diameter of the through opening in the leading region. The known expansion dowel can be set by means of a hammer in a simple manner without additional special setting tools. In addition, the collar provided at the trailing end of the dowel body ensures that the expansion dowel will expand evenly without regard to the depth of the through opening.

A disadvantage of this known expansion dowel is that the threaded rod is anchored in the internal thread of the expansion dowel by screwing in. This screwing in process takes considerable time and accordingly its use is uneconomical.

Further, the length of the threaded rod must be adapted to the application using a fine-tooth saw, for instance, which is very time-consuming. If a bolt cutter is used for this purpose instead of a fine-tooth saw, the threaded end of the threaded rod could be damaged. This causes an additional delay in the screw-in process or might even make it impossible.

SUMMARY OF THE INVENTION

It is a primary object of the present invention to provide an expansion dowel which enables a fast and dependable positioning of the threaded rod on the one hand and one that can be produced economically on the other hand.

According to the invention, this object is met in that the dowel body has, in the leading end region in the setting direction, at least a weakened portion which adjoins the internal thread at a distance opposite to the setting direction and acts as an articulation or joint and has at least two axially extending slits which open in the setting direction and extend at least into the region of the weakened portion.

Due to the fact that the internal thread is divided by at least two axially extending slits and a joint into threaded segments which bend radially outward and spring back, it is possible by means of expansion after the expansion dowel is fixed in the receiving material to insert the threaded rod into the through opening up to the desired position by axial pressure in the setting direction. By dispensing with the screw-in process, time is saved on the one hand and there is no substantial damage to the threaded end on the other hand. Accordingly, the length of the threaded rod can be adapted to the application by means of a bolt cutter. When a load acting on the positioned threaded rod opposite to the setting direction is applied, the threaded segments cause the load to be absorbed.

The weakened portion is preferably formed by a circumferentially extending groove. The groove is simple to form in terms of production technique and is accordingly economical.

Advantageously, the groove is arranged at the inside surface of the dowel body. This arrangement of the groove can be produced in one process step while forming the internal thread and results in a further reduction in production costs for the expansion dowel.

Further, preferably the weakened portion can also be achieved through the use of an elastic material at least in the region of the joint, resulting in a greater elasticity of the joint.

In order to ensure the insertion of the threaded rod with a small expenditure of force, the maximum distance corresponds roughly to the diameter of the internal thread.

An optimal holding of the load application means is ensured in that the groove has a depth corresponding to 0.05-times to 3-times the distance of the groove from the internal thread. In this respect, the joint acts as a fulcrum and the thread acts as a force application point. Moreover, in technical respects relating to manufacture, the depth of the groove can be monitored in a simple manner.

Due to the fact that the dowel body and the expansion sleeve are preferably made of plastic, the expansion sleeve can be manufactured economically. Metal can also be used as the material for the expansion dowel.

BRIFE DESCRIPTION OF THE DRAWING

The invention will be explained more fully in the following with reference to a drawing showing an embodiment of the invention.

DETAILED DESCRIPTION OF THE DRAWING

The drawing shows an expansion dowel according to the invention which has an axially extending dowel body 1 with a central through opening 2 and an axiallyl extending expansion sleeve 7 insertable into the through opening 2. The dowel body 1 has an axially extending leading end region 3 in the setting direction S and an axially extending trailing end region 4 extending in the setting direction S from the leading end region 3. The dowel body 2 has an axially extending slit 5 open at the trailing end of the dowel body and terminating about midway between the trailing and leading ends of the dowel body. The trailing end region 4 of the dowel body 1 forms the expansion region. A collar 6 which serves as a stop when the expansion dowel is set in a receiving material 12, for example, in concrete, is formed at the trailing end of the dowel body 1 and extends radially outwardly.

The central through opening 2 in the trailing end region 4 of the dowel body 1 serves to receive the expansion sleeve 7 which acts as an expansion element. The inner surface of the through opening 2 is formed conically along its entire axial length, specifically, in such a way that the inner diameter of the through opening 2 decreases in the setting direction S. The outer surface of the expansion sleeve 7 is constructed so as to complement the inner surface of the through opening 2 of the dowel body 1. When the expansion sleeve 7 is hammered into the through opening 2, it widens the expansion region. Owing to the conical construction of the through opening 2 and the expansion sleeve 7 which is shaped so as to complement the latter, the expanding force of the expansion sleeve 7 which is driven in is uniformly distributed along the contact surface between the dowel body 1 and expansion sleeve 7. In order to make it possible to monitor placement or setting, the expansion sleeve 7 is dimensioned such that it ends flush with the collar 6 without any excess length in the hammered in state.

The leading end region 3 of the dowel body 1 has a smaller outer and inner diameter than the trailing end region 4 and has an axially extending internal thread 8 serving as a load application means. In the region of the internal thread 8, the dowel body 1 has at least two axially extending slits 9 which open at the leading end of the dowel body 1 in the setting direction S. Opposite to the setting direction S at a distance a from the trailing end of the internal thread 8, the dowel body 1 has a pliable or plastic joint formed by a groove 11 with a depth r arranged at the inner circumference of the through opening 2. Together with the axially extending slits 9 projecting into the groove 11, the dowel body 1 is accordingly divided in the region of the internal thread 8 into threaded segments 13 which bend or deform outwardly and spring back. This makes it possible to insert a threaded rod 10 up to the desired position in the through opening 2 by a slight axial pressure in the setting direction S. When a load is applied at the positioned threaded rod 10 opposite to the setting direction S, the springing threaded segments 13 cause a safe absorption of the load.

What is claimed is:

1. Expansion dowel comprising an axially extending dowel body (1) arranged to be inserted in a setting direction S into an axially extending bore hole in a receiving material and an axially extending expansion sleeve (7), said dowel body (1) has a leading first end arranged to be inserted first into the bore hole a trailing second end and an axially extending through opening (2) extending between the first and second ends, said expansion sleeve (7) arranged to be inserted into the through opening (2) at the second end of said dowel body (1), said through opening (2) has an inside diameter decreasing in the second end to first end direction of the dowel body (1), said through opening (2) has an internal thread (8) extending axially from adjacent the first end toward the second end of said dowel body (1) and acting as means for applying a load, said dowel body (1) has a radially outwardly extending collar (6) at the second end thereof, said dowel body (1) has an axially extending first region (3) extending from the first end thereof toward the second end and an axially extending second region (4) extending from said first region toward the second end thereof, said second region has a greater outside diameter than said first region, said expansion sleeve has a cylindrical inside diameter and an outside diameter decreasing in the setting direction (S), said dowel body (1) has a weakened section in the first region (3) adjacent said second region (4) and spaced an axial distance (a) from said internal thread (8) and acting as a joint, and at least two axially extending slits (9) in said first region (3) open at said first end of said dowel body (1) and extending opposite to the setting direction (S) at least into said weakened section.

2. Expansion dowel, as set forth in claim 1, said weakened section is formed as a groove (11) extending circumferentially around said dowel body (1).

3. Expansion dowel, as set forth in claim 2, wherein said groove is located at a maximum distance (a) corresponding approximately to the diameter of said internal thread (8).

4. Expansion dowel as set forth in claim 3, wherein said groove (11) has a depth (r) transversely of the setting direction (S) in the range of 0.05 to 3 times the distance (a).

5. Expansion dowel asset forth in claim 2, wherein said groove (11) is located in an inside surface of said dowel body (1).

6. Expansion dowel, as set forth in claim 5, wherein said groove (11) is located at a maximum distance (a) corresponding approximately to the diameter of said internal thread (8).

7. Expansion dowel, as set forth in claim 1, wherein the weakened section is formed by an elastic material at least in the region of the joint.

8. Expansion dowel as set forth in claim 1, wherein said dowel body (1) and said expansion sleeve (7) are formed of a plastic material.

9. Expansion dowel as set forth in claim 1, wherein said dowel body (1) has an axially extending slit (5) extending from and open at the trailing end thereof in the second region (4).

* * * * *